United States Patent
Andonian et al.

(10) Patent No.: US 6,655,490 B2
(45) Date of Patent: Dec. 2, 2003

(54) STEER-BY-WIRE SYSTEM WITH STEERING FEEDBACK

(75) Inventors: Brian J. Andonian, Livonia, MI (US); Bing Zheng, Dublin, OH (US); Gregory J. Stout, Ann Arbor, MI (US); Muqtada Husain, Brownstown, MI (US); Maged Radamis, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/928,840

(22) Filed: Aug. 13, 2001

(65) Prior Publication Data

US 2002/0079155 A1 Jun. 27, 2002

Related U.S. Application Data

(60) Provisional application No. 60/224,845, filed on Aug. 11, 2000, and provisional application No. 60/224,965, filed on Aug. 11, 2000.

(51) Int. Cl.$^7$ ................................................ B62D 5/00
(52) U.S. Cl. ....................................... 180/402; 180/403
(58) Field of Search ................................ 180/402, 403, 180/421, 422, 443, 446

(56) References Cited

U.S. PATENT DOCUMENTS

| 4,771,846 | A | | 9/1988 | Venable et al. | |
|---|---|---|---|---|---|
| 5,097,917 | A | * | 3/1992 | Serizawa | 180/402 |
| 5,347,458 | A | * | 9/1994 | Serizawa | 180/402 |
| 5,355,215 | A | * | 10/1994 | Daido | 180/446 |
| 5,732,791 | A | * | 3/1998 | Pinkos | 180/446 |
| 5,896,942 | A | * | 4/1999 | Bohner | 180/402 |
| 5,908,457 | A | * | 6/1999 | Higashira | 180/402 |
| 5,964,814 | A | | 10/1999 | Müller et al. | |
| 6,012,540 | A | | 1/2000 | Bohner et al. | |
| 6,032,757 | A | | 3/2000 | Kawaguchi et al. | |
| 6,041,882 | A | | 3/2000 | Bohner et al. | |
| 6,059,068 | A | * | 5/2000 | Kato | 180/402 |
| 6,079,513 | A | * | 6/2000 | Nishizaki | 180/402 |
| 6,082,482 | A | * | 7/2000 | Kato | 180/402 |
| 6,176,341 | B1 | * | 1/2001 | Ansari | 180/402 |
| 6,213,248 | B1 | * | 4/2001 | Kawaguchi | 180/402 |
| 6,467,360 | B1 | * | 10/2002 | Bogdanov | 73/862.333 |
| 6,474,436 | B1 | * | 11/2002 | Konigorski | 180/402 |
| 2001/0032749 | A1 | * | 10/2001 | Thomas | 180/402 |

FOREIGN PATENT DOCUMENTS

| WO | WO 99/39967 | 8/1999 |
|---|---|---|
| WO | WO 99/58390 | 11/1999 |

* cited by examiner

*Primary Examiner*—Daniel G. DePumpo

(57) ABSTRACT

A steer-by-wire system of the preferred embodiment of the invention includes a steering subsystem, a turning subsystem, and a controller subsystem. The steering subsystem further includes a steering sensor to sense steering factors of a steering input, and a steering actuator to generate a steering feedback. The turning subsystem further includes a turning actuator to adjust a turning angle of a road wheel of the vehicle, and a turning sensor to sense turning factors of the turning actuator. The controller subsystem is connected to the steering sensor and to the turning sensor and controls the turning actuator and the steering actuator.

12 Claims, 2 Drawing Sheets

STEER-BY-WIRE SYSTEM WITH STEERING FEEDBACK

CROSS-REFERENCE TO RELATED APPLICATIONS

The present invention claims priority to U.S. Provisional Application Ser. No. 60/224,845, filed on Aug. 11, 2000 and U.S. Provisional Application Ser. No. 60/224,965, filed on Aug. 11, 2000.

TECHNICAL FIELD OF THE INVENTION

The present invention generally relates to steer-by-wire systems and, more specifically, to steer-by-wire systems that generate steering feedback to the driver of the vehicle.

BACKGROUND OF THE INVENTION

In conventional steering systems for a vehicle, such as manual or power steering systems, the steering wheel is mechanically coupled to the road wheels by a particular mechanism, such as a rack and pinion subsystem. These systems have inherent shortcomings, such as the complexity and weight of the mechanical coupling between the steering wheel and the road wheels, and the limited tunability of steering feedback. Although various steer-by-wire systems, which omit the mechanical coupling between the steering wheel and the road wheels, are known in the art, none of these systems specifically address steering feedback.

Steering feedback is an expected attribute of a vehicle, based on the existence of steering feedback in every vehicle using a conventional mechanical coupling between the steering wheel and the road wheels. The absence of steering feedback is most readily apparent during the use of a car racing video game. In these situations, the steering wheel may be spun to the left or the right without any resistance. The lack of steering feedback gives the driver of the vehicle a sense of disconnection with the road, which is typically a negative attribute. For this reason, there is a need in the automotive art, if not other arts, for a steer-by-wire system that generates steering feedback to the driver of the vehicle.

DETAILED DESCRIPTION OF THE PREFERRED EMBODIMENT AND METHOD

The following description of the preferred embodiment of the invention is not intended to limit the scope of the invention to this preferred embodiment, but rather to enable any person skilled in the arts of steer-by-wire to make and use the invention.

Figure 1:
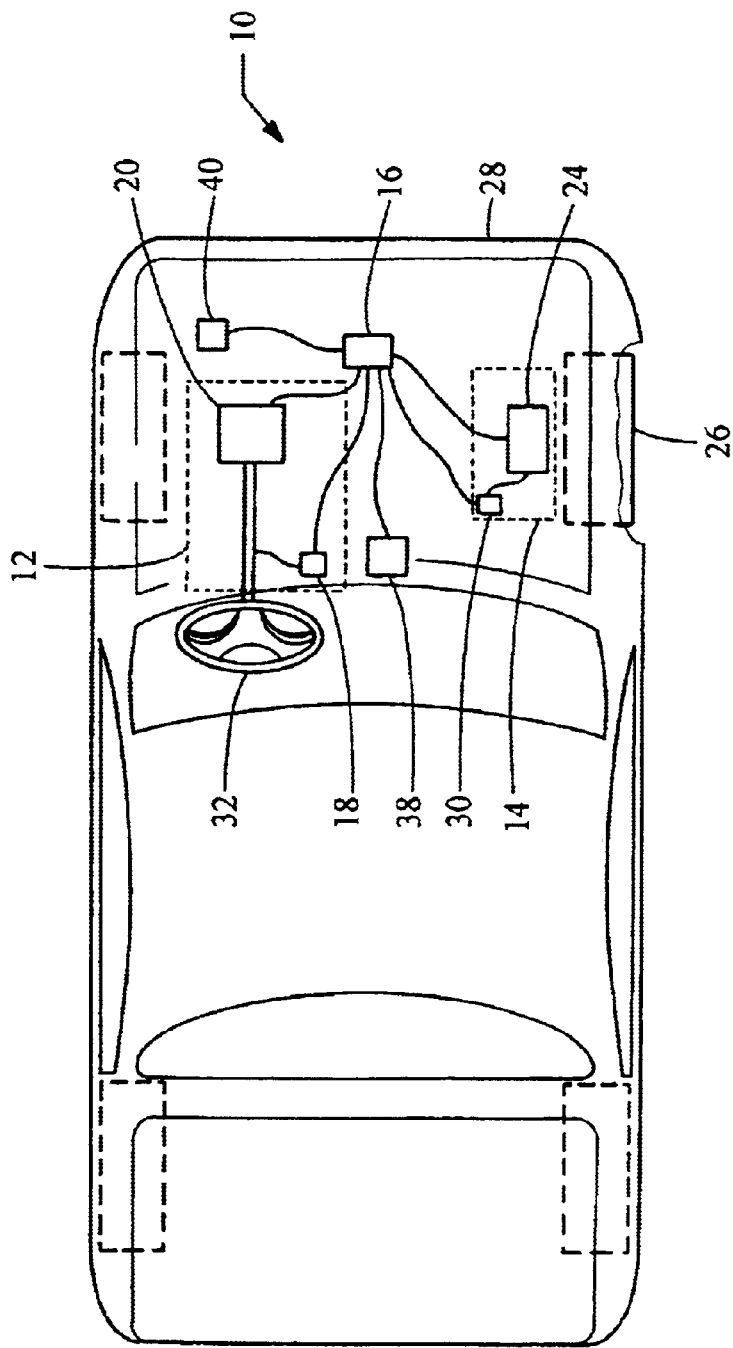
FIG. 1 is a schematic top view of the preferred embodiment of the invention.
Figure 2:
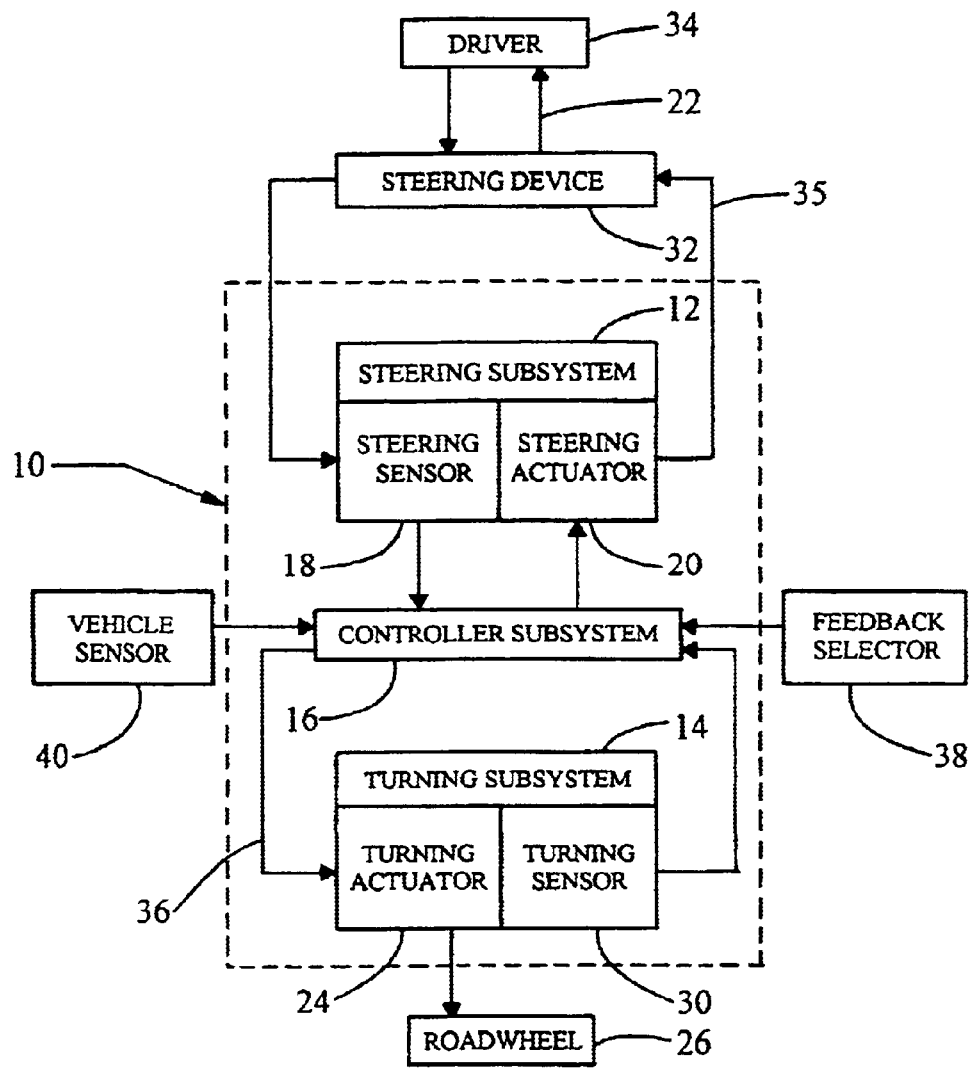
FIG. 2 is a schematic flow chart of the components and signals of the preferred method of the invention.

As shown in FIGS. 1 and 2, the steer-by-wire system 10 of the preferred embodiment of the invention includes a steering subsystem 12, a turning subsystem 14, and a controller subsystem 16. The steering subsystem 12 further includes a steering sensor 18 to sense steering factors of a steering input, and a steering actuator 20 to generate a steering feedback 22 (shown in FIG. 2). The turning subsystem 14 further includes a turning actuator 24 to adjust a turning angle of a road wheel 26 of the vehicle 28 (shown in FIG. 1), and a turning sensor 30 to sense turning factors of the turning actuator 24. The controller subsystem 16 is connected to the steering sensor 18 and to the turning sensor 30 and controls the turning actuator 24 and the steering actuator 20.

The steer-by-wire system 10 of the preferred embodiment of the invention has been specifically designed for a vehicle 28 having a road wheel 26 capable of turning and a steering device 32 capable of receiving a steering input from and transmitting a steering feedback 22 to a driver 34 (shown in FIG. 2) of the vehicle 28. The steer-by-wire system, however, may be used in other suitable environments, such as a watercraft having a rudder capable of turning and a tiller capable of receiving a steering input from and transmitting a steering feedback to an operator of the watercraft.

The steering sensor 18 of the steering subsystem 12, which functions to sense steering factors of the steering input, is preferably coupled to the steering device 32. The steering sensor 18 preferably includes a steering angle sensor and a steering torque sensor, which sense the steering angle and the steering torque, respectively, of the steering input. The steering angle and the steering torque are preferred measurements that indicate the steering intent of the driver 34 of the vehicle 28. These steering factors, however, are only preferred when the steer-by-wire system 10 interacts with a rotating steering device 32, such as a typical steering wheel of a typical vehicle 28. When the steer-by-wire system 10 interacts with other steering devices 32, such as a joystick, a touch pad, or a track ball, the steering factors may include other suitable measurements and, consequently, the steering sensor 18 may include other suitable sensors. The steering angle sensor and the steering torque sensor are preferably conventional sensors, but may alternatively be any suitable devices that sense steering factors of the steering input.

The steering actuator 20 of the steering subsystem 12, which functions to generate the steering feedback 22 to the driver 34, is preferably coupled to the steering device 32. In one variation, the steering actuator 20 includes a conventional electric motor to generate the steering feedback 22, while in another variation, the steering actuator 20 includes a conventional magneto-rheological device ("MR device") to generate the steering feedback 22. Other suitable devices, however, may be used to generate a resistive force that acts as a steering feedback 22 to the driver 34. The steering actuator 20 is preferably adapted to receive a steering feedback signal 35 from the control subsystem, as discussed below.

The turning actuator 24 of the turning subsystem 14, which functions to adjust the turning angle of the road wheel 26, is preferably mounted to the vehicle 28 and coupled to the road wheel 26. In the preferred embodiment, the turning actuator 24 is a conventional electrical power-assisted steering device 32 connected to the road wheel 26 through a conventional electric motor and a conventional rack and pinion subsystem. In alternative embodiments, any suitable device capable of turning the road wheel 26 may be used. The turning actuator 24 is further adapted to receive a turning control signal 36 (shown in FIG. 2) from the controller subsystem 16, as discussed below.

The turning sensor 30 of the turning subsystem 14, which functions to sense turning factors of the turning actuator 24, is preferably coupled to the turning actuator 24. The turning sensor 30 preferably includes a conventional road wheel angle sensor, current sensor and a temperature sensor, which function to sense the angle of the road wheel 26, current draw of the turning actuator 24, and the temperature of the turning actuator 24, respectively. The road wheel angle, current draw, and the temperature are preferred measurements that indicate the force applied by the turning actuator 24 to accomplish a predetermined adjustment of the turning angle of the road wheel 26. In alternative embodiments, especially in the embodiments that do not include an electric motor as the turning actuator 24, the turning sensor 30 may include other suitable devices to measure the turning factors of the turning actuator 24. The road wheel angle sensor, the current sensor, and the temperature sensor are preferably conventional sensors, but may alternatively be any suitable devices that sense turning factors of the turning actuator 24.

The controller subsystem 16, which functions to control the turning angle of the road wheel 26 and the steering feedback 22 of the steering device 32, is preferably connected to the steering sensor 18 and to the turning sensor 30. In this manner, the controller subsystem 16 preferably produces a turning control signal 36 for the turning actuator 24 based on the steering factors. Also, the controller subsystem 16 preferably produces a steering feedback signal 35 for the steering actuator 20 based on the steering factors and on the turning factors. As discussed below, the controller subsystem 16 may alternatively produce the turning control signal 36 and the steering feedback signal 35 based on additional factors.

In the preferred embodiment of the invention, the steer-by-wire system 10 further includes a feedback selector 38. The feedback selector 38, which preferably functions to receive a feedback selection from the driver 34, is preferably mounted to the interior compartment of the vehicle 28 within an easy reach of the driver 34. The feedback selector 38 preferably includes several settings, ranging from zero to full feedback selection. In this manner, the driver 34 may choose to alter the magnitude, or existence, of the steering feedback 22 of the steer-by-wire system 10. In this embodiment, the controller subsystem 16 is further coupled to the feedback selector 38 and is further adapted to produce the steering feedback signal 35 based also on the feedback selection.

In the preferred embodiment of the invention, the steer-by-wire system 10 further includes a vehicle sensor 40. The vehicle sensor 40, which is preferably mounted at some location in the vehicle 28, preferably functions to sense vehicle factors of the vehicle 28. The vehicle sensor 40 preferably includes a vehicle speed sensor, a vehicle lateral acceleration sensor, and a vehicle yaw rate sensor, which preferably sense the vehicle speed, the vehicle lateral acceleration, and the vehicle yaw rate, respectively. The vehicle speed, vehicle lateral acceleration, and vehicle yaw rate are preferred measurements that indicate the current dynamic status of the vehicle 28. The vehicle sensor 40 may also include an ignition mode sensor that senses the ignition mode of the vehicle 28, and a vehicle roll sensor and a vehicle pitch sensor, which sense the vehicle roll and vehicle pitch of the vehicle 28, respectively. These vehicle factors collectively describe the current dynamic status of the vehicle 28. In this preferred embodiment, the controller subsystem 16 is further coupled to the vehicle sensor 40 and is further adapted to produce the turning control signal 36 based also on the vehicle 28 factors. The sensors of the vehicle sensor are preferably conventional sensors, but may alternatively be any suitable device that senses vehicle factors of the vehicle.

During operation of the steer-by-wire system 10, the driver 34 of the vehicle 28 delivers a steering input to the steering device 32 of the vehicle 28. The steering sensor 18 senses steering factors of the steering input and, from these steering factors, the controller subsystem 16 determines the steering intent of the driver 34. Preferably simultaneously, the vehicle sensor 40 senses vehicle factors of the vehicle 28 and the turning sensor 30 senses turning factors of the turning actuator 24. From these vehicle factors and turning factors, the controller subsystem 16 determines the current dynamic status of the vehicle 28. Then the controller subsystem 16 compares the steering intent with the current dynamic status and, from this comparison, the controller subsystem 16 produces an appropriate turning control signal 36 and steering feedback signal 35. By producing the turning control signal 36 and the steering feedback signal 35, the steer-by-wire system 10 controls the turning angle of the road wheel 26 and controls the steering feedback 22 of the steering device 32.

As the above description suggests, the terms "steering sensor", "turning sensor", and "vehicle sensor" may include components one or more in number, local or remote to the vehicle 32, specialized or shared in their functionality.

As any person skilled in the art of steer-by-wire systems will recognize from the previous detailed description and from the figures and claims, modifications and changes can be made to the preferred embodiment of the invention without departing from the scope of this invention defined in the following claims.

We claim:

1. A steer-by-wire system for a vehicle having a road wheel capable of turning and a steering device capable of receiving a steering input from and transmitting a steering feedback to a driver of the vehicle, comprising:

a steering subsystem including a steering sensor coupled to the steering device and adapted to sense steering factors of the steering input, and a steering actuator coupled to the steering device and adapted to receive a steering feedback signal and to generate the steering feedback to the driver;

a turning subsystem including a turning actuator coupled to the road wheel and adapted to receive a turning control signal and to adjust a turning angle of the road wheel, and a turning sensor coupled to the turning actuator and adapted to sense turning factors of the turning actuator;

a feedback selector adapted to receive a feedback selection from the driver; and a controller subsystem connected to said steering sensor, to said turning sensor, and to said feedback selector, and adapted to produce the turning control signal based on the steering factors thereby controlling the turning angle of the road wheel and to produce the steering feedback signal based on the steering factors, the turning factors, and the feedback selection thereby controlling the steering feedback of the steering device.

2. A steer-by-wire system for a vehicle of claim 1, wherein said steering actuator includes an electric motor to generate the steering feedback.

3. A steer-by-wire system for a vehicle of claim 1, wherein said steering actuator includes a magneto-rheological device to generate the steering feedback.

4. A steer-by-wire system for a vehicle of claim 1, wherein steering factors include steering angle and steering torque.

5. A steer-by-wire system for a vehicle of claim 1, wherein said turning factors include a current draw of said turning actuator.

6. A steer-by-wire system for a vehicle of claim 5, wherein said turning factors also include a temperature of said turning actuator.

7. A steer-by-wire system for a vehicle of claim 1, further including a vehicle sensor adapted to sense vehicle factors, wherein said controller subsystem is further coupled to the vehicle sensor and is further adapted to produce the turning control signal based also on the vehicle factors.

8. A steer-by-wire system for a vehicle of claim 7, wherein said vehicle factors include vehicle speed, vehicle lateral acceleration and vehicle yaw rate.

9. A steer-by-wire system for a vehicle of claim 8, wherein said vehicle factors also include ignition mode.

10. A steer-by-wire system for a vehicle of claim 9, wherein said vehicle factors also include vehicle roll and vehicle pitch.

11. A steer-by-wire system for a vehicle of claim 1, wherein said feedback selector is adapted to be mounted to an interior compartment of the vehicle.

12. A steer-by-wire system for a vehicle of claim 1, wherein said feedback selector includes several settings, ranging from zero to full feedback selection, which allows a driver of the vehicle to alter the magnitude of the steering feedback of the steer-by-wire system.

* * * * *